(12) United States Patent
Bonte et al.

(10) Patent No.: US 12,041,884 B2
(45) Date of Patent: Jul. 23, 2024

(54) AGRICULTURAL BALING MACHINES

(71) Applicant: CNH Industrial America LLC, New Holland, PA (US)

(72) Inventors: Xavier G. J. M. Bonte, PB Zuidzande (NL); Frederik Demon, Bruges (BE)

(73) Assignee: CNH Industrial America LLC, New Holland, PA (US)

( * ) Notice: Subject to any disclaimer, the term of this patent is extended or adjusted under 35 U.S.C. 154(b) by 649 days.

(21) Appl. No.: 17/245,481

(22) Filed: Apr. 30, 2021

(65) Prior Publication Data

US 2021/0243957 A1 Aug. 12, 2021

Related U.S. Application Data

(63) Continuation of application No. PCT/EP2019/079692, filed on Oct. 30, 2019.

(30) Foreign Application Priority Data

Nov. 2, 2018 (EP) .................... 18204219

(51) Int. Cl.
*A01F 15/08* (2006.01)
*A01B 59/04* (2006.01)
(Continued)

(52) U.S. Cl.
CPC ........ *A01F 15/0841* (2013.01); *A01B 59/042* (2013.01); *A01B 71/06* (2013.01); *A01F 15/042* (2013.01); *A01F 15/046* (2013.01)

(58) Field of Classification Search
CPC .. A01F 15/0841; A01F 15/042; A01F 15/046; F16H 37/124; A01B 71/06;
(Continued)

(56) References Cited

U.S. PATENT DOCUMENTS 2,890,646 A * 6/1959 Soteropulos ........ A01F 15/0825
100/909
4,184,312 A * 1/1980 Oosterling ............ A01F 15/046
100/189

(Continued)

FOREIGN PATENT DOCUMENTS

CN 201064104 Y 5/2008
DE 2749485 A * 5/1978 ........... A01F 15/046

OTHER PUBLICATIONS

Notification of Transmittal of the International Search Report and the Written Opinion of the International Searching Authority, or the Declaration dated Jan. 31, 2020 for International Application No. PCT/EP2019/079692 (10 pages).

(Continued)

*Primary Examiner* — Abigail A Risic
(74) *Attorney, Agent, or Firm* — Peter K. Zacharias; Rebecca L. Henkel; Rickard K. DeMille

(57) ABSTRACT

An agricultural baling machine including: a frame; a connection point for attaching to a towing vehicle; a plunger in a bale-forming chamber; a driveline for taking power from the towing vehicle and causing reciprocal rectilinear motion of the plunger in the bale-forming chamber; and a drawbar member that provides a mechanical link between the connection point and the frame. The drawbar member is rotatably coupled to the frame such that the height of the connection point relative to the frame of the baling machine is adjustable.

16 Claims, 6 Drawing Sheets

(51) Int. Cl.
*A01B 59/042* (2006.01)
*A01B 71/06* (2006.01)
*A01F 15/04* (2006.01)

(58) Field of Classification Search
CPC ......... A01B 59/042; F16D 2500/10437; F16D 2500/30406
See application file for complete search history.

(56) References Cited

U.S. PATENT DOCUMENTS

| | | | | |
|---|---|---|---|---|
| 4,184,426 | A * | 1/1980 | Oosterling | A01F 15/046 100/258 R |
| 4,193,251 | A * | 3/1980 | Oosterling | A01F 15/046 100/98 R |
| 5,123,338 | A * | 6/1992 | Mathis | A01F 15/0825 56/341 |
| 5,950,410 | A * | 9/1999 | O'Brien | A01F 15/0841 100/88 |
| 6,457,405 | B1 * | 10/2002 | Lippens | A01F 15/0825 100/192 |
| 7,007,599 | B2 * | 3/2006 | Roth | A01F 15/101 100/99 |
| 11,051,455 | B2 * | 7/2021 | Monbaliu | A01F 15/0825 |
| 2008/0121401 | A1 * | 5/2008 | Posselius | A01B 61/02 172/1 |
| 2009/0057516 | A1 * | 3/2009 | Schlesser | A01B 59/042 248/309.2 |
| 2014/0137757 | A1 * | 5/2014 | Nelson | A01F 15/0841 100/102 |
| 2015/0053444 | A1 * | 2/2015 | Kovach | A01B 59/042 172/677 |
| 2016/0192593 | A1 * | 7/2016 | Bonte | F16D 65/28 100/219 |
| 2017/0156269 | A1 * | 6/2017 | Benevelli | A01F 15/0841 |
| 2017/0196170 | A1 | 7/2017 | Benevelli et al. | |
| 2018/0098508 | A1 | 4/2018 | Kraus | |

OTHER PUBLICATIONS

Extended European Search Report dated May 10, 2019 for European Patent Application No. 18204219.2 (6 pages).

* cited by examiner

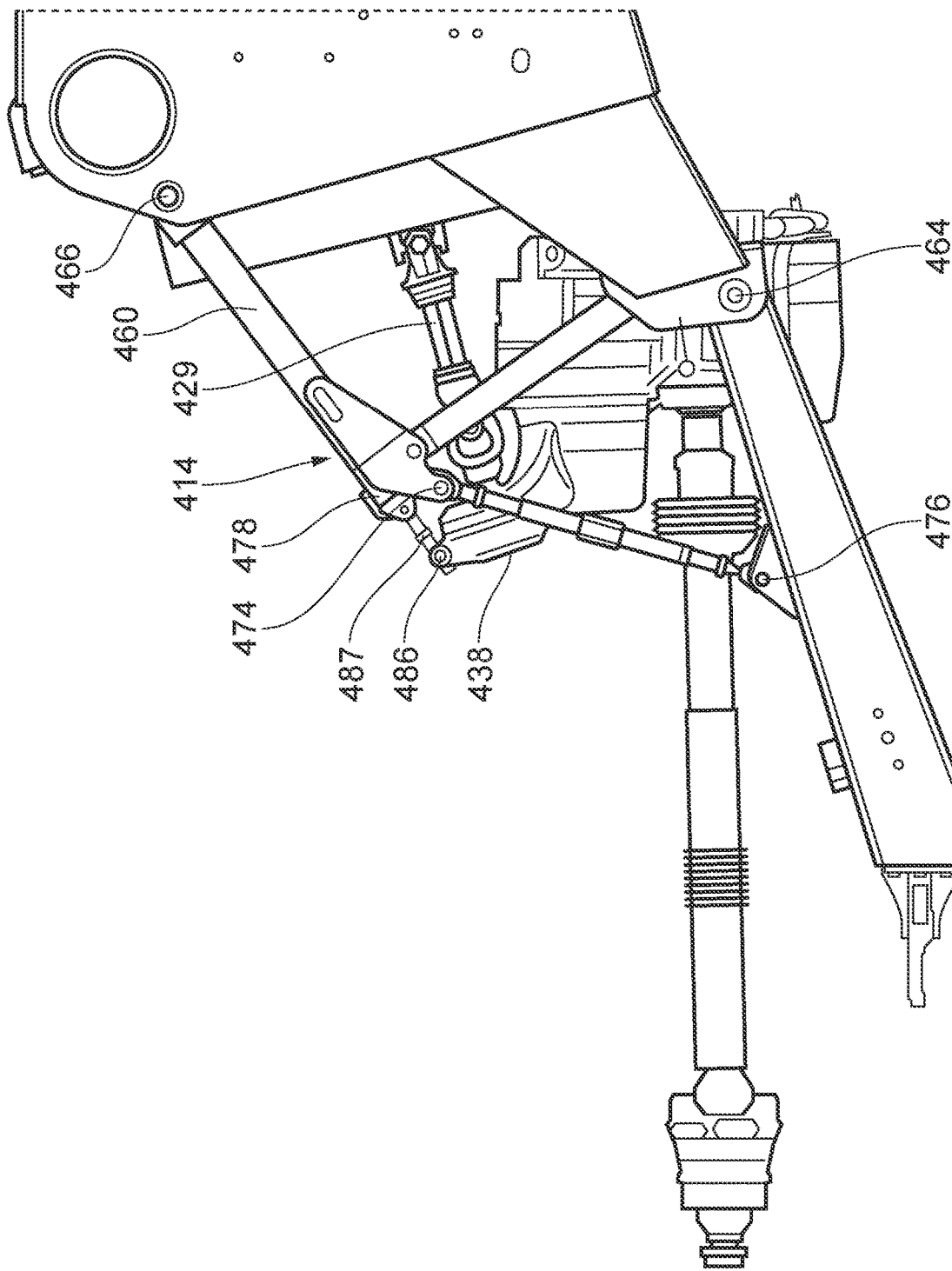

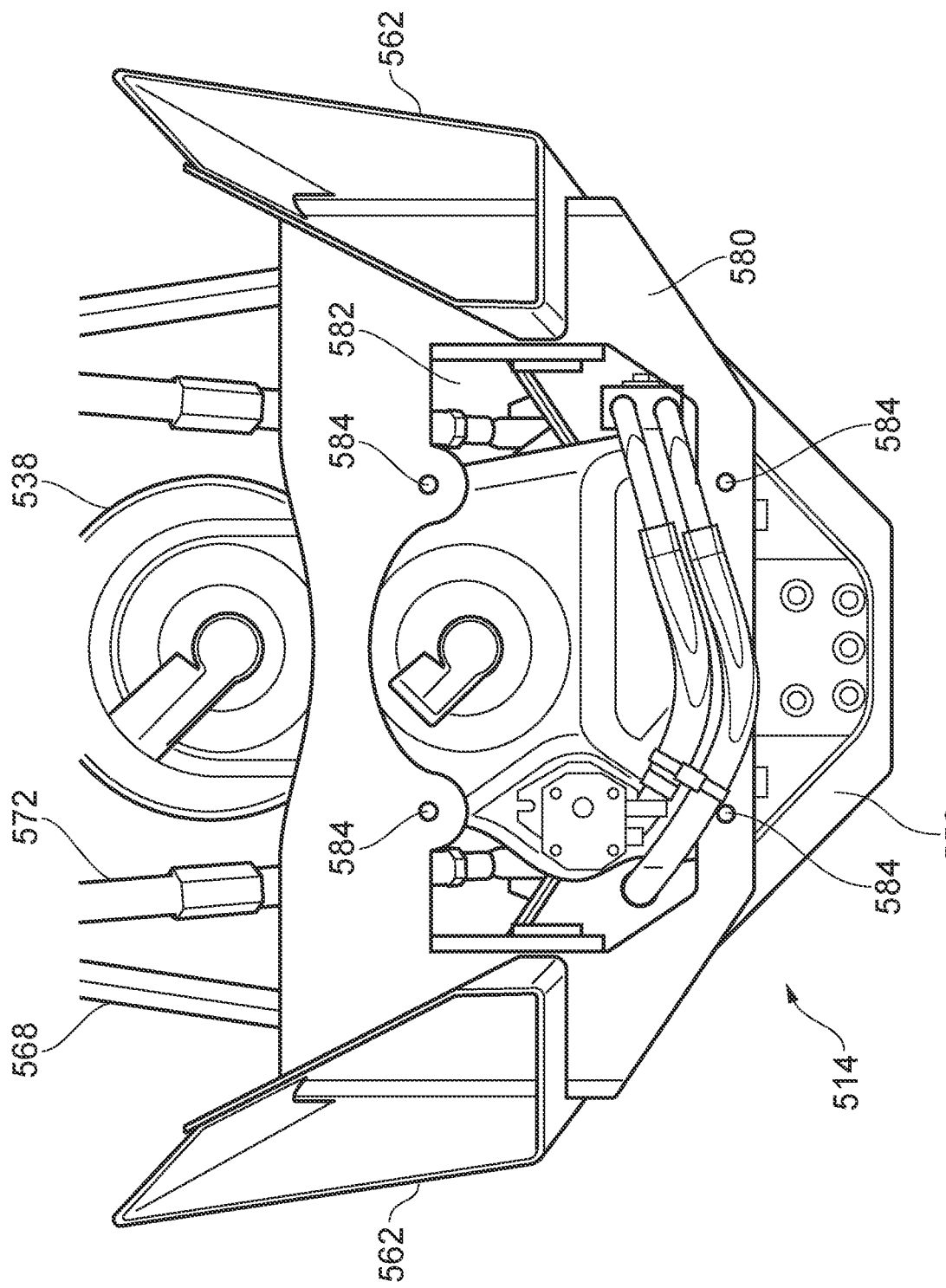

AGRICULTURAL BALING MACHINES

CROSS REFERENCE TO RELATED APPLICATIONS

This is a continuation of PCT application No. PCT/EP2019/079692, entitled "Improvements in or Relating to Agricultural Baling Machines", filed Oct. 30, 2019, which is incorporated herein by reference. PCT application No. PCT/EP2019/079692 claims priority to European patent application EP 18204219.2, entitled "Improvements in or Relating to Agricultural Baling Machines", filed Nov. 2, 2018, which is incorporated herein by reference.

FIELD OF THE INVENTION

The present invention relates to a combination of an agricultural baling machine with a towing vehicle, and, more particularly, to an agricultural baling machine.

BACKGROUND OF THE INVENTION

Baling machines are well known in agriculture and are widely used to bale plant matter in fields into bales that may be conveniently and effectively handled, stored and used. Baling machines are known that bale forage products such as grass and other leaves used as hay or other types of animal feed; straw or other plant parts resulting as by-products from a harvesting operation such as combine harvesting; cotton; and other plant parts of commercial or other value.

The majority of baling machines in use in Europe are designed to be towed behind an agricultural tractor or another towing vehicle that, under the control of an operator and/or using operator-monitored software, moves the baling machine about a field and provides power to operate internal parts of the baling machine. The provision of power is effected by way of a rotatable power take-off (PTO) shaft connected to the rotary power take-off that typically is part of the tractor.

Known designs of agricultural baling machine include a pick-up, mounted at the front of the machine, that causes the ingestion of plant matter into the interior of the machine as it moves about a field. Differing internal designs of baler components are known in the part of the machine downstream of the pick-up.

One commonplace type of baling machine is often referred to as a "rectangular baler". This includes a cuboidal bale-forming chamber in which the ingested plant matter is compacted into a cuboidal shape by a piston or plunger that reciprocates longitudinally back and forth inside the bale-forming chamber between retracted and extended positions. Charges of plant matter repeatedly are fed into the bale-forming chamber from the pick-up by the mechanism of the baling machine. This action is timed with the motion of the plunger such that feeding of plant matter coincides with retraction of the plunger to one end of the bale-forming chamber. The plant matter then is compacted by subsequent extension strokes of the plunger along the bale-forming chamber.

The reciprocal rectilinear motion of the plunger is effected using a driveline that converts rotary drive derived from the rotating PTO shaft, connected to the baling machine above the pick-up, into reciprocal motion of the plunger. This typically is achieved by changing, in the driveline, the axis of the rotation from one parallel to the longitudinal length of the baling machine to an axis of rotation transverse thereto.

Such transverse-axis rotation is applied to a crank that is pivot-jointed to one end of a conrod the other end of which is pivot-jointed to the plunger, that is moveably captive inside the bale-forming chamber. As a result, rotation of the crank causes the reciprocal movement of the plunger.

The driveline between the power take-off of the tractor and the plunger can include a clutch that in a typical case is formed of two or more dry friction plates that are urged into mutual engagement by a hydraulic actuator or spring arrangement. Additionally a heavy flywheel (that in some baling machine designs weighs 600 kg or more) is secured to a rotatable shaft that defines or is connected to an input shaft in turn connected in use to the PTO shaft.

The flywheel is used because the plunger during its motion is associated with very high, and highly varying, levels of kinetic energy that might peak at 800 Hp (about 600 kW). In the absence of the flywheel it might be impossible for the rotary power take-off of a tractor to provide sufficient power to move the plunger, and very high forces might be transmitted back towards the tractor via the PTO shaft potentially causing damage to the baling machine or tractor or making the tractor-baling machine combination difficult to control.

The invention seeks to solve or ameliorate one or more problems of prior art baling machines.

Embodiments of the invention are suitable for inclusion in all baling machine types and machinery combinations disclosed herein. The disclosure of embodiments or parts of embodiments herein includes their disclosure in combination with all baling machine types and machinery combinations herein, even if these are indicated as forming part of the prior art.

The terms "baling machine" and "baler" are used synonymously herein and in the art generally.

The term "power take-off" is synonymous with the acronym "PTO".

The term "tractor" embraces a wide variety of machines potentially capable of towing a baling machine, as will be known to the person of skill in the art.

The term "clutch" except as otherwise explained embraces any design of clutch that is suitable for transferring drive in the circumstances described.

The term "plant matter" and derivatives potentially includes all types of matter that potentially may be ingested into a baling machine for the purpose of being formed into bales.

The terms "piston" and "plunger" in the context of the principal, moveable, bale-forming part of a bale-forming chamber are used synonymously herein.

SUMMARY OF THE INVENTION

According to a first aspect of the invention, there is provided an agricultural baling machine including: a frame; a connection point for attaching to a towing vehicle; a plunger in a bale-forming chamber; a driveline for taking power from the towing vehicle and causing reciprocal rectilinear motion of the plunger in the bale-forming chamber; and a drawbar member that provides a mechanical link between the connection point and the frame; wherein the drawbar member is rotatably coupled to the frame such that the height of the connection point relative to the frame of the baling machine is adjustable.

Advantageously, the height of the connection point for the towing vehicle relative to the frame of the baler can be adjustable, and the baler can be adequately used with different types of towing vehicles. Also, rotating the drawbar member can adjust the relative orientation and positions of the drawbar member with respect to a rotary input shaft. Such adjustment can be used to reduce the likelihood that they will interfere with each other during use. This can especially be a problem when the towing vehicle is turning because there are two different connection points between the towing vehicle and the baler that are offset from each other.

The baling machine may further include an adjustable support member that is: adjustable in length; and connected, directly or indirectly, between the frame and the drawbar member.

The adjustable support member may include a spindle such that the length of the adjustable support member is manually adjustable.

The adjustable support member may include an actuator such that the length of the adjustable support member can be automatically or remotely controlled.

The baling machine may further include: one or more sensors configured to generate sensed-height-data that is representative of the height of a towing hitch at the rear of the towing vehicle. The baling machine may further include: a controller configured to process the sensed-height-data and automatically control the actuator to set the length of the adjustable support member, and thereby adjust the height of the connection point such that it is suitable for attaching to the towing hitch of the towing vehicle.

The adjustable support member may be rotatably connected between: (i) an upper drawbar support connection point on the frame, and (ii) a drawbar support connection point that is associated with a central region, in a longitudinal dimension, of the drawbar member.

The baling machine may further include: a lower drawbar member that includes the drawbar member; and a drawbar assembly that provides a mechanical link between the connection point and the frame. The drawbar assembly may include, on at least one side of the baling machine: the lower drawbar member and an upper drawbar member, wherein both members extend in a longitudinal direction of the baling machine from the frame towards the connection point.

The adjustable support member may be connected between the upper drawbar member and the lower drawbar member.

The lower drawbar member may be spaced apart from the upper drawbar member in a vertical dimension such that one or more components of the driveline are accessible from the side of the baling machine through the drawbar assembly.

The frame may provide a lower drawbar connection point, to which the lower drawbar member is rotatably connected; and an upper drawbar connection point, to which the upper drawbar member is connected. The lower drawbar connection point may be further forwards on the frame, in a longitudinal dimension of the baling machine, than the upper drawbar connection point.

The baling machine may further include: an upper drawbar support member that is connected between: (i) a distal portion of the upper drawbar member, and (ii) a drawbar support connection point on the frame, wherein the drawbar support connection point is vertically lower than the upper drawbar connection point.

The driveline may include one or more of: a rotary input shaft, a transmission, a rotatable flywheel and a flywheel shaft.

The drawbar assembly may include: a first lower drawbar member and a first upper drawbar member on one side of the baling machine. Both members may extend in a longitudinal direction of the baling machine from the frame towards the connection point. The drawbar assembly may include: a second lower drawbar member and a second upper drawbar member on the other side of the baling machine. Both members may extend in a longitudinal direction of the baling machine from the frame towards the connection point.

The first lower drawbar member may be rotatably coupled to the frame. The second lower drawbar member may be rotatably coupled to the frame.

The first lower drawbar member may be spaced apart from the first upper drawbar member in a vertical dimension such that one or more components of the driveline are accessible from the side of the baling machine through the drawbar assembly. The second lower drawbar member may be spaced apart from the second upper drawbar member in a vertical dimension such that one or more components of the driveline are accessible from the side of the baling machine through the drawbar assembly.

The baling machine may further include an upper lateral supporting member that is connected between distal ends of the first upper drawbar member and the second upper drawbar member.

BRIEF DESCRIPTION OF THE DRAWINGS

The above-mentioned and other features and advantages of this invention, and the manner of attaining them, will become more apparent and the invention will be better understood by reference to the following description of exemplary embodiments of the invention taken in conjunction with the accompanying drawings, wherein:

FIG. 4 shows a side view of the drawbar assembly of FIG. 3;

FIG. 5C shows a back view of the drawbar assembly with the transmission connected to the baler in the same way that it is connected to the baler in FIGS. 3 and 4.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
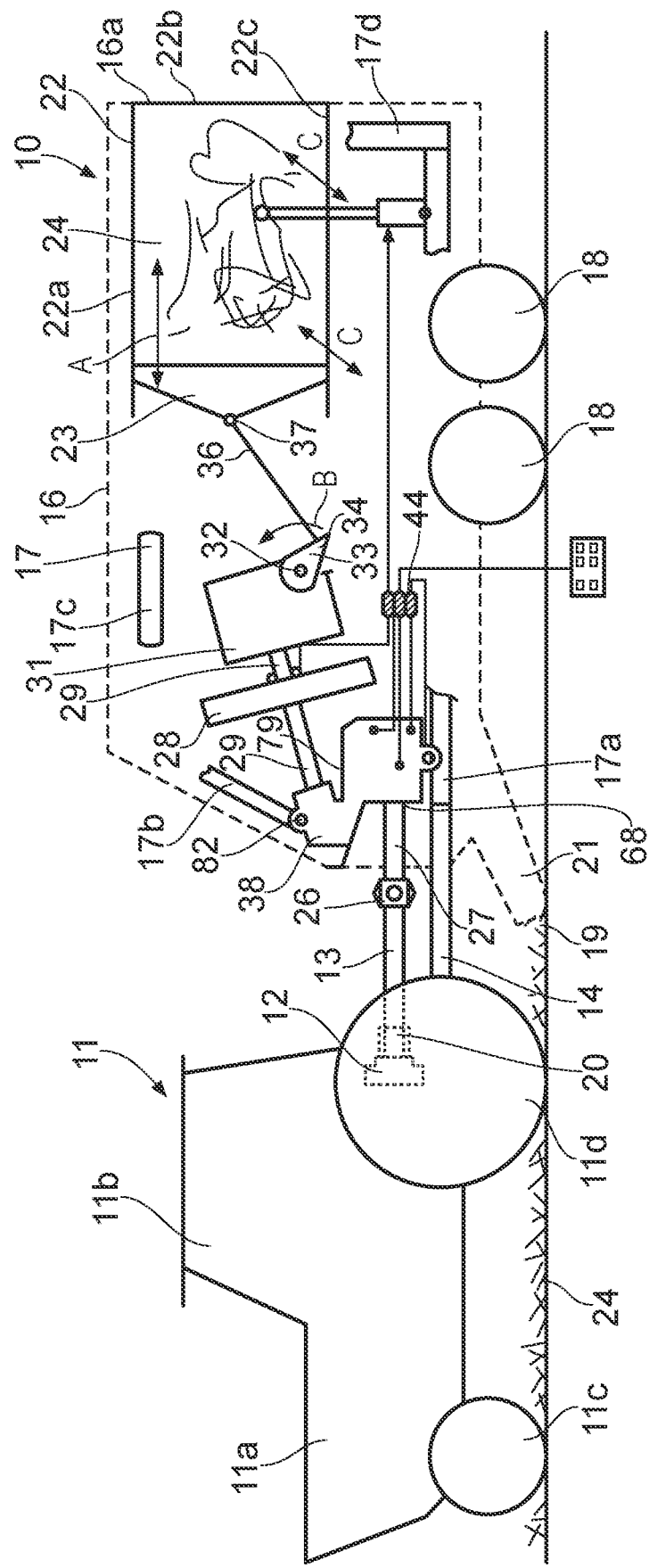
FIG. 1 is a schematic representation of a tractor-baling machine combination in accordance with embodiments described herein.

Referring to the drawings a baling machine 10 is shown being towed behind a towing vehicle that in the illustrated embodiment non-limitingly is an agricultural tractor 11.

The tractor 11 is a conventional tractor including a vehicle frame/body 11a, rear-mounted cab 11b, front, steerable, ground-engaging wheels 11c and rear, driven, ground-engaging wheels 11d. Tractor 11 includes at its rear end between the rear wheels 11d a power take-off 12 of a conventional design that includes a rotative coupling for a PTO shaft 13 that extends rearwardly of the tractor 11. The PTO 12 may be engaged to cause rotation of the PTO shaft 13 or disengaged, such that the shaft 13 is not powered to rotate, for example through the operation of a control lever or pushbutton.

The tractor 11 may have any of a range of engine power outputs including but not limited to 200 hp, 300 hp and 400 hp. The baling machine 10 is operable when towed by any such tractor 11, without a need for adjustment or modification, for the reasons explained below.

The PTO shaft 13 may be any of a variety of lengths. A relatively short PTO shaft 13 and drawbar 14 (described below) minimizes the distance between the pick-up 19 (described below) of the baling machine 10 and the tractor 11. This provides certain advantages, although in some other respects a longer PTO shaft 13 may provide good adjustment flexibility.

The partial driveline represented by the PTO 12 and PTO shaft 13 may in various types of tractor include a PTO clutch 20 that seeks to protect the engine of the tractor 11 from damage caused e.g. when an excessive loading on the PTO shaft causes engine stalling. The PTO clutch 20 is shown schematically in FIG. 1. It may readily be envisaged by the person of skill in the art and typically would be a one-way clutch of a kind that permits free movement when rotating in one direction, and transfers rotary drive via the PTO shaft 13 when rotating in the opposite direction. Other forms and locations are possible in respect of the clutch 20.

The baling machine 10 is secured to the rear of the tractor 11 by way of a drawbar 14 that typically is of an "A"-shape when viewed in plan and extends forwardly of the baling machine 10 below the PTO shaft 13. The drawbar 14 is pivotably secured to a conventional towing hitch at the rear of the tractor 11.

The baling machine 10 includes a housing or cover 16 that may take a variety of forms. The housing 16 in most baling machine designs includes a section 16a that is open to permit ejection of formed bales at the rear of the baling machine 10.

Panels defining the housing 16 further may be openable or removable in order to permit maintenance of the interior parts of the baling machine 10 replacement of bobbins of twine used for tying completed bales or the clearance of blockages that can arise for a variety of reasons.

The housing 16 of the baling machine 10 is secured to a baling machine frame 17 selected parts 17a, 17b, 17c, 17d of which are illustrated in FIG. 1, with the complete frame 17 being omitted for ease of illustration.

The baling machine 10 is mobile and to this end it includes secured to the frame 17 two or more ground-engaging wheels 18.

In the embodiment illustrated four wheels are provided, being left and right front wheels and left and right rear wheels 18. In FIG. 1 the left-hand side front and rear wheels are visible.

In this regard the front or forward end of the baling machine 10 is the end of it that is closest to the towing tractor 11, and the terms "rear", "left", "right", "upper", "lower" and derivative terms are interpreted accordingly and as though an observer is looking forwardly along the baling machine 10.

The wheels 18 may be mounted relative to the frame 17 by way of suspension components and passive or active steering components as would be known to the person of skill in the art, or they may be mounted more simply. The wheels 18 optionally may include tires and/or gripping elements that are omitted from FIG. 1 for ease of viewing.

A pick-up 19 projects forwardly of the baling machine 10 and is arranged to collect cut plant matter 24 lying in a field in which the baling machine 10 moves as influenced by the motion of the tractor 11. The pick-up 19 passes the plant matter to a conveyor 21. The conveyor 21 conveys the plant matter inside the baling machine 10 where it undergoes baling.

Numerous designs of pick-up 19 and conveyor 21 are known in the baling machine art and fall within the scope of embodiments disclosed herein. The precise designs of the pick-up 19 and conveyor 21 are essentially immaterial to the nature and operation of the invention, and therefore are not described in detail.

As mentioned, the baling machine 10 includes an internal bale-forming chamber 22. This is an elongate, cuboidal volume defined by chamber walls of which top and bottom walls 22a and 22c are visible in FIG. 1. The bale-forming chamber 22 in a typical baling machine design extends in a fore and aft direction in an upper part of the rear of the volume enclosed by the housing 16.

The rear 22b of the bale-forming chamber coincides with the aforementioned open housing section 16a in order to allow ejection of completed bales in a per se known manner.

A crop flow path exists inside the baling machine 10 between the conveyor 21 and the bale-forming chamber 22. The crop flow path may readily be envisaged and is omitted from the figures for clarity.

The forwardmost end of the bale-forming chamber 22 is essentially open. A plunger 23 occupies the interior cross-section of the bale-forming chamber 22 and is constrained to move longitudinally inside the chamber 22 from the open, forward end towards and away from the rear 22b of the bale-forming chamber as signified by arrow A.

The PTO shaft 13 as mentioned may be powered to rotate, in virtually all tractors in a clockwise direction when viewed from behind the tractor 11. PTO shaft 13 is connected by way of at least one, and in practice two, universal joint 26 to the forwardmost end of a rotary input shaft 27 of the baling machine 10. The universal joint 26 in a well-known manner accommodates changes in the relative orientation of the tractor 11 and baling machine 10 that result from towing of the baling machine from place to place, e.g. while the baler is working or when it is travelling between fields.

As will be described in more detail below, a driveline, which includes the input shaft 27, takes power from the tractor 11 and causes reciprocal rectilinear motion of the plunger 23 in the bale-forming chamber 22.

The driveline includes a flywheel 28, which is supported on a flywheel shaft 29 that also is supported using journal bearings, or a functionally similar arrangement, that further is omitted from FIG. 1. The functions of the flywheel 28 are as described above.

The rear end of the flywheel shaft 29 is a rotary input to a drive converter 31 or similar transmission that by way of intermeshing gear components alters the axis of rotation of rotative energy in the baling machine 10.

The nature of the drive converter 31 thus is such that the longitudinally extending (with reference to the elongate length of the baling machine 10 as illustrated) axis of rotation of the flywheel shaft 29 becomes rotation about a transversely extending axis of a crankshaft 32.

Crankshaft 32 is connected as shown to a crank member 33 that protrudes from the drive converter 31 in a manner presenting a free end 34. The free end 34 is pivotably connected to one end of a conrod 36 the other end of which is pivotably connected, as indicated by numeral 37, to the forward side of the plunger 23.

As is apparent from FIG. 1 therefore, rotation of crankshaft 32 causes rotation of crank 33, as signified by arrow B, that gives rise to the rectilinear, reciprocal motion of plunger 23 indicated by arrow A.

In this regard it is somewhat arbitrary whether crank 33 rotates clockwise or anti-clockwise, since reciprocal motion of the plunger 23 may in an appropriately designed set of driveline elements be achieved regardless of the direction of rotation of the crank 33. The actual rotational direction of the crank 33 would be a consequence of the internal design of the drive converter 31. Such aspects are not relevant to an understanding of the invention, and therefore are not provided in detail herein.

Charges of plant matter 24 conveyed inside the baling machine 10 from the conveyor 21 repeatedly are at intervals fed by internal components of the baling machine 10, that are omitted from FIG. 1 for clarity, into the interior of the bale-forming chamber 22 for compaction by reason of the reciprocal, rectilinear motion (arrow A) of the plunger 23. The feeding of each charge of plant matter 24 is timed to coincide with positioning of the plunger 23 at its retracted, i.e. forwardmost position, with the result that the plant matter 24 becomes compressed and compacted by the movement of the plunger 23 into bale form after it has been fed in to the bale-forming chamber 22.

In this example, the driveline that includes the input shaft 27 and the flywheel shaft 29 also includes a transmission 38. The transmission 38 provides first and second selectable transmission ratios between the rotary input shaft 27 and the flywheel shaft 29. This transmission 38 may be referred to as a mid-gearbox.

The baling machine 10 includes a controller non-limitingly illustrated schematically in FIG. 1 in the form of a programmable microprocessor 44. The baling machine 10 includes a source of electrical power, for the microprocessor 44, that in certain embodiments may take the form of a rotary generator that is driven directly or indirectly by the PTO shaft, although other sources of electrical power including batteries and other storage devices, or other types of generator, are possible. Combinations of electrical power sources furthermore are possible.

As indicated the controller may take a variety of forms and need not be a microprocessor as illustrated.

The microprocessor 44 is capable (typically but not necessarily as a result of software and/or firmware programming) of selectively engaging the first or the second transmission ratio of the transmission 38. The arrangement of the components and/or the programming of the microprocessor 44 prevents the first and second transmission ratios from being selected simultaneously.

The transmission 38 in certain embodiments includes a rigid housing 79. The layout of the components of the transmission 38 inside the housing 79 can be such that the driveline components defining the first transmission ratio occupy a first vertically extending distance in the housing 79; and the driveline components defining the second transmission ratio occupy a second vertically extending distance in the gearbox housing, the upper limit of the second vertically extending distance terminating below the upper limit of the first vertically extending distance.

This means that the transmission 38 is compact in the longitudinal dimension of the baling machine 10, and also that the output of the transmission 38 is connected to the flywheel shaft 29 at a relatively high point in the baling machine 10. This provides several advantages in terms of transferring drive input via the input shaft 27 to the location of the plunger 23, which is located relatively high inside the baling machine 10.

The rigid housing 79 may be formed e.g. by casting from a metal alloy, especially a high stiffness, lightweight alloy. In some applications, the rigid housing 79 is designed such that it can be constructed of a readily available material such as cast iron. As will be explained below, the housing 79 of the transmission 38 can be positioned such that it interconnects with one or more portions of the frame and/or a drawbar assembly in a manner that enhances the stiffness of the frame and/or the drawbar assembly of the baler. By way of non-limiting example, such interconnection can be achieved by way of perforated lugs 81, 82 by means of which the housing 79 is bolted to interconnect to a frame member or a drawbar assembly. However, as will be apparent to the person of skill in the art, such interconnection may be achieved in a variety of alternative ways.

Figure 2:
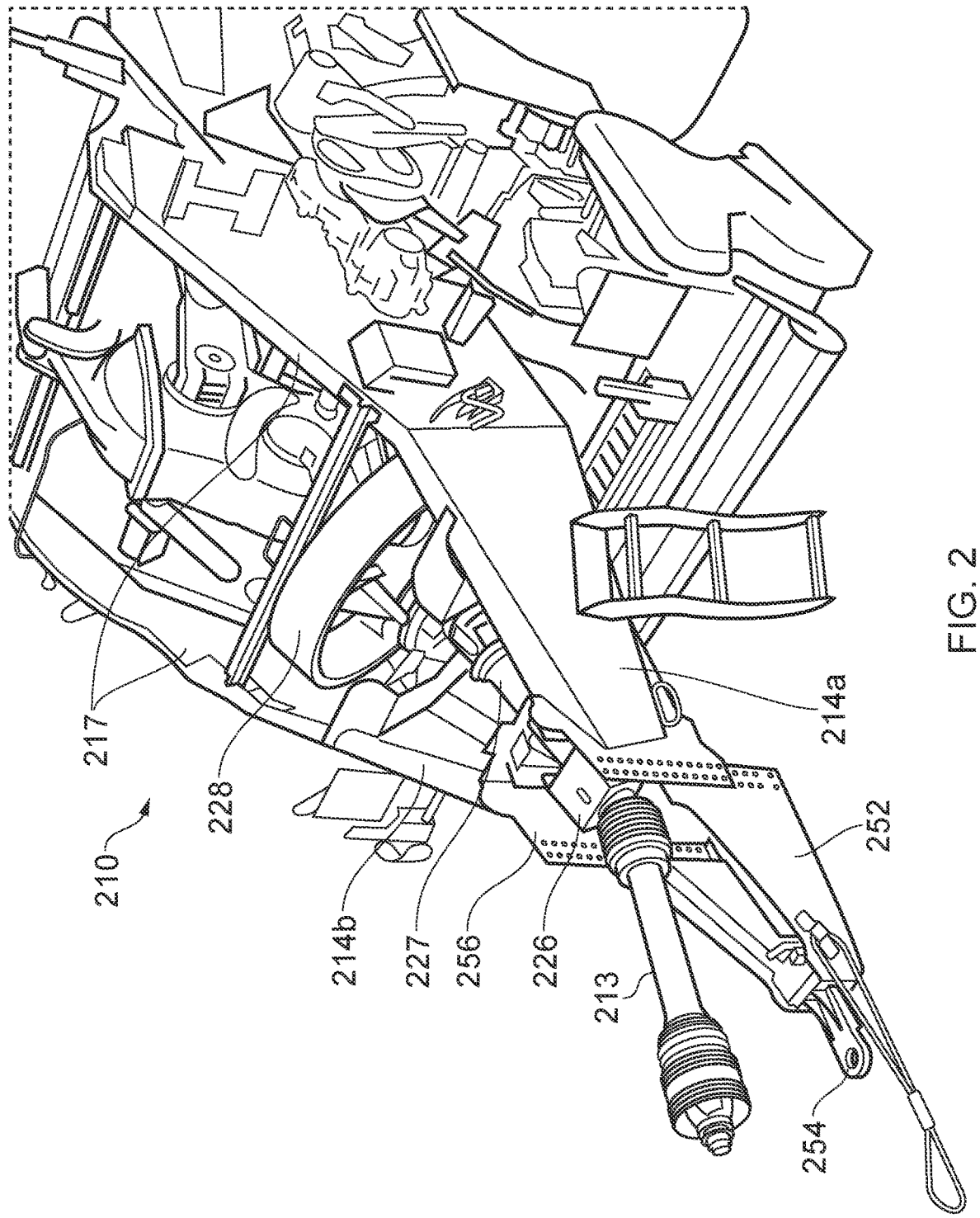
FIG. 2 shows a perspective view of the front of a baler that has an enclosed drawbar assembly.

FIG. 2 shows a perspective view of the front of a baler 210 that has an enclosed drawbar assembly. The baler 210 includes a frame 217, and also a connection point 254 for attaching to a towing vehicle, such as the towing hitch of a tractor. The drawbar assembly provides a mechanical link between the connection point 254 and the frame 217. More particularly, the drawbar assembly includes a left drawbar member 214a and a right drawbar member 214b that are made of sheet metal, and are provided as extensions of the frame 217. In this way, the drawbar members 214a, 214b can be considered as integrated in the frame 217. Each of the left and right drawbar members 214a, 214b extend forwardly, in a longitudinal direction of the baler 210, from the frame 217 to a hitch mounting section 256. The left and right drawbar members 214a, 214b are permanently or releasably secured to the hitch mounting section 256. The baler 210 also includes a hitch 252, which provides a mechanical link between the hitch mounting section 256 and the connection point 254. The hitch 252 is releasably connected to the hitch mounting section 256 such that it can be raised or lowered to suit the particular towing vehicle to which the baler 210 is to be connected.

A universal joint 226 is connected to the hitch mounting section 256. The universal joint 226 provides a rotary connection between a primary PTO shaft 213 (that is connected to the towing vehicle) and a secondary PTO shaft 227 (that is connected to the flywheel 228).

If access to the flywheel 228 or the secondary PTO shaft 227 is required, for example for maintenance purposes, then an operator may have to climb on top of the baler and reach down from above. This can be dangerous; especially when heavy components, such as the flywheel 228, need to be accessed. In fact, in some examples it may not be possible to access some of these components without breaking/disassembling the drawbar assembly.

Figure 3:
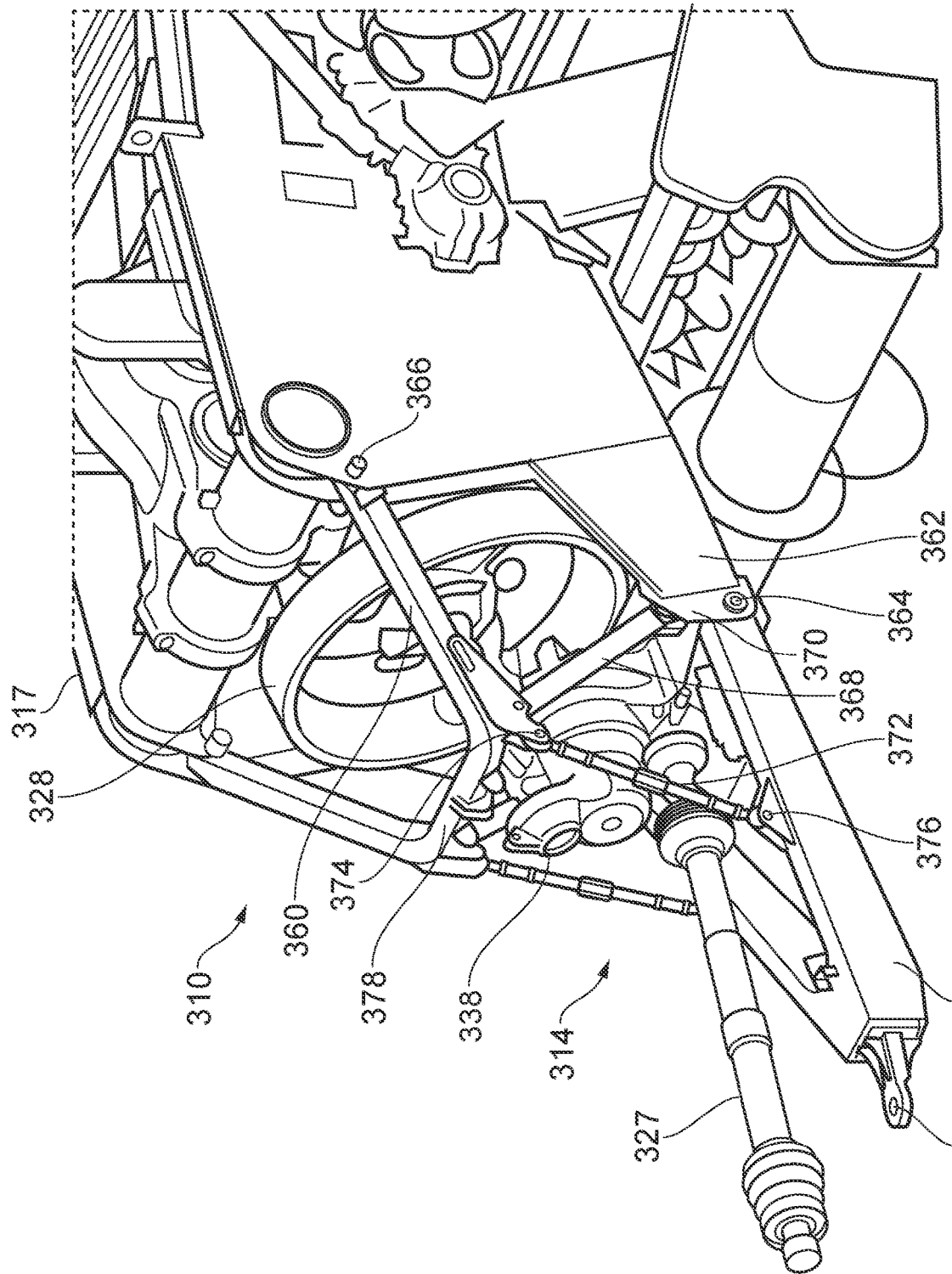
FIG. 3 shows a perspective view of the front of a baler that has an open drawbar assembly.

FIG. 3 shows a perspective view of the front of a baler 310 that has an open drawbar assembly 314. FIG. 4 shows a side view of the drawbar assembly 414 of FIG. 3, with corresponding reference numbers in the 400 series. As will be discussed below, such an open drawbar assembly 314 can be advantageous over the closed drawbar of FIG. 2 because it provides easier access to driveline components of the baler 310. Also, the open drawbar assembly 314 can be lower weight than a closed drawbar assembly. In some prior art balers, weight was simply not an issue. However, especially for the baler 310 of FIG. 3 where the driveline components are relatively compact, a drawbar assembly 314 having a reduced weight can be a significant advantage.

Shown in FIG. 3 is part of the frame 317 of the baler, and also the connection point 354 for attaching to a towing vehicle. The baler 310 has a driveline for taking power from the towing vehicle and causing reciprocal rectilinear motion of the plunger (not shown) in the bale-forming chamber, as discussed above. In this example, the driveline includes a rotary input shaft 327, a transmission 338, a rotatable flywheel 328 and a flywheel shaft. The flywheel shaft connects the transmission 338 to the flywheel 328, as shown in FIGS. 1 and 4 with references 29 and 429. However, the flywheel shaft is obscured in FIG. 3. The distal end of rotary input shaft 327 (distal from the frame 317 of the baler) can be connected directly or indirectly to a PTO of the towing vehicle.

The drawbar assembly 314 provides a mechanical link between the connection point 354 and the frame 317 such that the towing vehicle can tow the baler 310. The drawbar assembly 314 includes, on both sides of the baling machine: a lower drawbar member 358 and an upper drawbar member 360. Both the lower drawbar members 358 and the upper drawbar members 360 extend in a longitudinal direction of the baler from the frame 317 towards the connection point 354. As shown in FIG. 3, it is not necessary that both the lower drawbar member 358 and the upper drawbar member 360 actually reach the connection point 354. In this example, the upper drawbar member 360 extends forwards from the frame 317 only partway towards the connection point 354. As will be discussed below, a distal portion of the upper drawbar member 360 can be mechanically connected to either or both of: (i) the lower drawbar member 358; and (ii) the frame 317. In this way, each upper drawbar member can be attached to the frame 317 at two points that are spaced apart in a vertical dimension.

The lower drawbar member 358 is spaced apart from the upper drawbar member 360 in a vertical dimension such that one or more components of the driveline are accessible from the side of the baler 310 through the drawbar assembly 314, more particularly, at least in part through the drawbar assembly 314 between the upper drawbar member 360 and the lower drawbar member 358. In FIG. 3, the following components of the driveline are accessible from the side through the drawbar assembly 314: the transmission 338, the flywheel shaft, and the flywheel 328. It will be appreciated that in other examples, the dimensions of the drawbar assembly 314 can be different such that it is also possible to access some or all of the input shaft 327 through the side of the drawbar assembly 314.

In this example, lower drawbar member 358 is spaced apart from the upper drawbar member 360 by about 700 mm, in a vertical dimension, for at least part of the length of the upper drawbar member 360. This spacing can be any distance in the range of 400 mm to 1,000 mm in other applications. The specific spacing indicated above between the lower drawbar member 358 and the upper drawbar member 360 can be for the majority of the length of the upper drawbar member 360 and/or the lower drawbar member 358, and can be for more than 50%, 75%, 80% or 90% of the length of the upper drawbar member 360 and/or the lower drawbar member 358.

The open drawbar assembly 314 can have movable shieldings (not shown) placed over at least the sides of the drawbar assembly 314. The movable shieldings can provide a protective shield for one or more of the rotating parts of the driveline when the baler 310 is in use. When the baler 310 is static, and at least some of the driveline components are not rotating, one or more of the movable shieldings can be moved to an open position such that an operator can access the driveline components through the open drawbar assembly. The movable shieldings can be relatively lightweight because they do not need to have the strength that is required to provide the mechanical link between the towing vehicle and the baler 310. That is, the force imparted on the baler 310 through the connection point 354 when the towing vehicle is towing the baler 310, does not pass through the movable shielding.

In FIG. 3, the frame 317 includes a frame extension region 362, which can be integral with the frame 317. The frame extension region 362 provides a lower drawbar connection point 364, to which the lower drawbar member 358 is connected. The frame 317 also provides an upper drawbar connection point 366, to which the upper drawbar member 360 is connected. In this example, the frame extension region 362 includes a panel that extends forwards from the frame 317 for a lower part of the frame, but not for an upper part of the frame. That is, a lower portion of the frame 317 terminates at a position that is further forwards than the position at which an upper portion of the frame 317 terminates. In this way, the frame extension region 362 provides a lower drawbar connection point 364 that is further forwards (in a longitudinal dimension) than the upper drawbar connection point 366. Also, due to the presence of the frame extension region 362, the edge of a lower region of the frame 317 is closer to the connection point 354 than the edge of an upper region of the frame 317.

In this example, an upper drawbar support member 368 is connected between the upper drawbar member 360 and a drawbar support connection point 370 on the frame 317. The drawbar support connection point 370 is vertically lower than the upper drawbar connection point 366. More particularly, in this example the upper drawbar support member 368 is connected between: (i) a distal portion of the upper drawbar member 360 (distal from the frame 317), and (ii) a drawbar support connection point 370 on the frame extension region 362. The drawbar support connection point 370 is further forwards on the frame than the upper drawbar connection point 366. In this example, the distal portion of the upper drawbar member 360 (to which the upper drawbar support member 368 is connected) is further forwards than the drawbar support connection point 370—in this way, the upper drawbar support member 368 moves further away from the connection point 354 as it extends away from the upper drawbar member 360. The upper drawbar support member 368 can be considered as a fixed drawbar support member because it can be permanently secured to both the upper drawbar member 360 and the frame 317 during use.

In FIG. 3 the lower drawbar member 358 is rotatably connected to the frame 317, and more particularly to the lower drawbar connection point 364 on the frame extension region 362 in this example. In this way, advantageously the height of the connection point 354 for the towing vehicle relative to the frame 317 of the baler 310 is adjustable, and the baler 310 can be adequately used with different types of towing vehicles. That is, the axis of rotation has a component that is transverse to the longitudinal axis of the baler, and can be generally parallel with the ground.

Also, rotating the lower drawbar member 358 can adjust the relative orientation and positions of the lower drawbar member 358 and the rotary input shaft 327. Such adjustment can be used to reduce the likelihood that they will interfere with each other during use. This can especially be a problem when the towing vehicle is turning because there are two different connection points between the towing vehicle and the baler that are offset from each other. These are: (i) the connection formed by the connection point 354 of the baler 310 being hitched to the towing vehicle such that the towing vehicle can tow the baler 310; and (ii) the connection formed between rotating shafts of the towing vehicle and the baler (for instance at a universal joint (not shown) at the distal end of the rotary input shaft 327) such that rotational power is provided to the baler 310 in order for it to perform baling operations. Since these connections are offset from each other, the rotary input shaft 327 can move relative to the drawbar assembly 314 during use.

In this example, the drawbar assembly 314 also includes an adjustable support member 372 that is connected between the upper drawbar member 360 and the lower drawbar member 358. More particularly, in this example, the adjustable support member 372 is rotatably connected between: (i) an upper drawbar support connection point 374 that is associated with a distal end of the upper drawbar member 360, and (ii) a lower drawbar support connection point 376 that is associated with a central region (in a longitudinal dimension) of the lower drawbar member 358. In this example, the lower drawbar support connection point 376 is further forwards than the upper drawbar support connection point 374.

The adjustable support member 372 is adjustable in length such that it can be used in applications where at least one of the upper drawbar member 360 and the lower drawbar member 358 is movable with respect to the other. In examples where the upper drawbar member 360 and the lower drawbar member 358 are in a fixed orientation with respect to each other, the adjustable support member 372 can be considered as a drawbar connection support member that may or may not have a fixed (non-adjustable) length.

The adjustable support member 372 can be provided with a spindle such that the length of the adjustable support member 372 can be manually adjusted, and therefore the relative positioning between the lower drawbar member 358 and the rotary input shaft 327 can also be adjusted. In other examples, the adjustable support member 372 can be provided with an actuator such that the length of the adjustable support member 372 can be automatically or remotely controlled. For instance, an operator can control the actuator by means of any appropriate interface such that the lower drawbar member 358 can be raised or lowered so that it suits the towing vehicle with which it is being used.

In some examples, one or more sensors can be associated with the baler 310, and can generate sensed-height-data that is representative of the height of a towing hitch at the rear of the towing vehicle. Then a controller can process the sensed-height-data and automatically control the actuator to set the length of the adjustable support member 372, and thereby adjust the height of the connection point 354 such that it is suitable for attaching to the towing hitch of the towing vehicle.

In examples where the lower drawbar member 358 is rotatably coupled to the frame 317 (as shown), the adjustable support member 372 may be connected directly or indirectly between any part of the frame 317 and the lower drawbar member 358. For instance, if the drawbar assembly does not have upper drawbar members 360, then the drawbar connection support member 372 can be connected between: an upper drawbar support connection point on the frame 317, and the lower drawbar member 358.

In FIG. 3, the upper drawbar member 360 is initially rotatably connected to the frame 317 at the upper drawbar connection point 366 such that it can be rotated with respect to the frame 317 as the baler is assembled. Then, once the baler 310 is fully assembled, the upper drawbar member 360 is fixedly connected to the frame 317 such that it retains the same orientation with respect to the frame 317 during use. In other examples, that are not illustrated, the upper drawbar member 360 can be rotatably coupled to the frame 317 also during use. Also optionally, the lower drawbar member 358 can be fixedly connected to the frame 317.

In FIG. 3, the lower drawbar member 358 is shown in a lower hitch configuration. That is the connection point 354 is lower than the rotary input shaft 327, and the drawbar assembly 314 is configured for use with a towing vehicle in which the towing hitch of the towing vehicle is lower than the PTO on the towing vehicle (as shown in FIG. 1). Advantageously, the lower drawbar member 358 in this example can be: (i) detached from the frame at the lower drawbar connection points 364, and detached from the upper drawbar member 360 at the lower drawbar support connection points 376; (ii) flipped upside down; and then (iii) reattached to the frame at the lower drawbar connection points 364, and reattached to the upper drawbar member 360 at the lower drawbar support connection points 376 such that it is located above the rotary input shaft 327. It will be appreciated that this can involve adjusting the length of the adjustable support members 372. In this way, the lower drawbar member 358 can be put in an upper hitch configuration, such that the connection point 354 is higher than the rotary input shaft 327, and the drawbar assembly 314 is configured for use with a towing vehicle in which the towing hitch of the towing vehicle is higher than the PTO on the towing vehicle. That is, the drawbar assembly 314 can be attachable to the frame 317 of the baler in: (i) a lower hitch configuration; and (ii) a higher hitch configuration.

In some examples, the lower drawbar member 358 can have multiple connection points for connecting to the adjustable support members 372, such that different connection points can be used for the higher and lower hitch configurations.

In this example, the drawbar assembly 314 has a left side and a right side that are both open. Therefore, each of the components described above can be present on both the left side of the baler 310 and the right side of the baler 310. Accordingly, each of the above components can be prefixed with "left" and "right" (or "first" and "second") to designate one of the sides of the baler. In other examples the drawbar assembly 314 may be open on one side and closed on the other side, such that the above components are only provided on one side of the baler 310.

As shown in FIG. 3, the drawbar assembly 314 includes an upper lateral supporting member 378 that is connected between the left upper drawbar member 360 and the right upper drawbar member. In this example, the upper lateral supporting member 378 connects distal ends of the left upper drawbar member 360 and the right upper drawbar member. Optionally, the left upper drawbar member 360, the right upper drawbar member, and the upper lateral supporting member 378 can be provided as a unitary component such that all three members are integrally provided. The upper lateral supporting member 378 can advantageously provide increased lateral support and strength to the drawbar assembly 314.

In this example, the left lower drawbar member 358 and the right lower drawbar member are joined together at their distal ends. The connection point for the towing vehicle is connected to the joined together distal ends of the lower drawbar members. Optionally, the left lower drawbar member 358 and the right lower drawbar member can be provided as a unitary component such that the two members are integrally provided.

FIG. 4 shows a side view of the drawbar assembly 414 of FIG. 3. Components of FIG. 4 that are shown in FIG. 3 have been given corresponding reference numbers in the 400 series.

In particular in FIG. 4, the flywheel shaft 429 and various connection points 466, 474, 476, 464 are clearly shown.

Figure 5A:
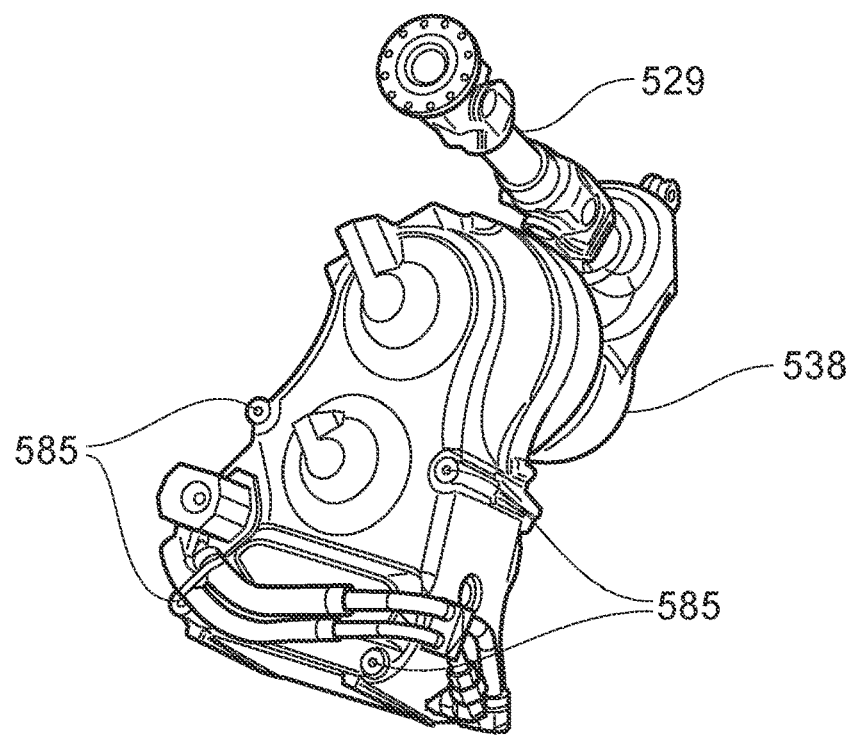
FIGS. 5A and 5B show transmission of FIGS. 3 and 4 in more detail.
Figure 5B:
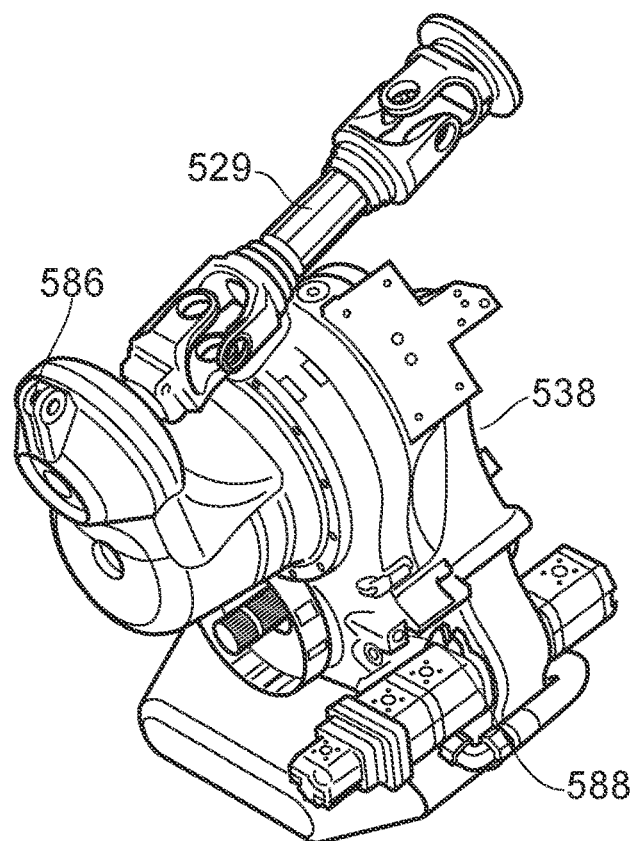

FIGS. 5A and 5B show the transmission 538 of FIGS. 3 and 4 in more detail. FIG. 5C shows a back view of the drawbar assembly 514 with the transmission 538 connected to the baler in the same way that it is connected to the baler in FIGS. 3 and 4. Features of FIGS. 5A to 5C that have been described with reference to FIGS. 3 and 4 will be given corresponding reference numbers in the 500 series.

As shown in FIG. 5C, the drawbar assembly 514 includes a transmission mounting member 580 that provides a mechanical connection between the transmission 538 and the frame. The transmission mounting member 580 is connected at each of its lateral ends to the frame, and more particularly each end is connected to one of the frame extension regions 562 in this example. The transmission mounting member 580 also includes one or more transmission connection points 584 for mechanically connecting to the transmission 538. In this way, the transmission 538 can advantageously be used as a frame stiffening element such that the overall weight of the baler can be reduced because additional strengthening components within the frame may not be required—for instance a relatively thin, and therefore low weight, transmission mounting member 580 can be used. In the illustrated embodiment, the primary stiffening effect of the transmission 538 is in a horizontal plane. It will be appreciated that the transmission 538 can also, or instead, provide a stiffening effect in a vertical plane.

In this example, the transmission mounting member 580 has at least one aperture 582. Such an aperture 582 can be possible because the strength required of the transmission mounting member 580 is reduced because of its reinforcement due to its connection with the transmission 538. Advantageously, the presence of the aperture 582 can ensure that the weight of the transmission mounting member 580 is kept to a minimum. As a further advantage, the aperture 582 can provide access to the transmission 538; for example for lubricant/coolant to be communicated to or from the transmission 538.

In this example, the transmission mounting member 580 includes four transmission connection points 584 for mechanically connecting to the transmission 538. These transmission connection points 584 may be provided as holes through the transmission mounting member 580 through which bolts can be passed. Similarly, as best shown in FIG. 5A, the transmission 538 includes corresponding transmission mounting member connection points 585 for mechanically connecting to the transmission mounting member 580. The transmission mounting member connection points 585 can be provided as threaded holes in the housing of the transmission 538 into which bolts can be secured to connect the transmission 538 to the transmission mounting member 580. It will be appreciated that any other type of mechanical attachment means can be used.

In other examples, the transmission mounting member 580 can be provided as a plurality of separate sub-members that do not necessarily extend the entire width of the baler frame between the two frame extension regions 562. For instance: (i) a first transmission mounting sub-member can be connected to the left frame extension region 562, and can provide one or more transmission connection points for connecting to the transmission 538; and (ii) a second transmission mounting sub-member can be connected to the right frame extension region 562, and can also provide one or more transmission connection points for connecting to the transmission 538. The first and second transmission mounting sub-members can be separate components, yet because they are both mechanically connected to the transmission 538 can function together with the transmission 538 to provide the necessary lateral strength for the baler to function correctly.

One or more of the transmission connection points 584 can be provided at a position in the transmission mounting member 580 that is vertically higher than a laterally extending aperture—two of the transmission connection points 584 are provided above the aperture 582 in FIG. 5C. Similarly, one or more of the transmission connection points 584 can be provided at a position in the transmission mounting member 580 that is vertically lower than a laterally extending aperture—two of the transmission connection points 584 are provided below the aperture 582 in FIG. 5C. It will be appreciated that "vertically higher than" and "vertically lower than" does not necessarily mean that the transmission connection points 584 must be higher or lower than all parts of the aperture 582; instead the transmission connection points 584 can be higher or lower than the portion of the aperture 582 that is laterally aligned with the transmission connection point 584 (as shown in FIG. 5C).

As best shown in FIG. 5B, the transmission 538 also includes an upper drawbar member connection point 586 for connecting the transmission 538 to the upper drawbar members of the drawbar assembly. In this example, the upper drawbar member connection point 586 is provided as a pair of perforated lugs through which a bolt can be passed to secure the transmission 538 to the upper drawbar members. A corresponding transmission connection bar 487 (which can also be considered as a transmission connection point in some examples) is associated with the upper drawbar members 460, either directly or indirectly. The corresponding transmission connection bar 487 is for connecting the upper drawbar members 460 to the transmission 438. In this example, the transmission connection bar 487 extends indirectly from the upper drawbar members 460 because it extends from the upper lateral supporting member 478 (the upper lateral supporting member 478 is connected between the left upper drawbar member 460 and the right upper drawbar member). In this way, the upper lateral supporting member 478 can be located between the pair of perforated lugs on the transmission (as shown in FIG. 5B with reference 586). Then a nut and bolt, or other securing means, can be used to connect the transmission connection bar 487 to the upper drawbar member connection point 486 of the transmission 438. The connection between the transmission 438 and the upper drawbar members 460 can advantageously take up the forces that are exerted on the transmission 438 by the flywheel shaft 429 and therefore can improve the working lifetime of the transmission 438.

Returning to FIGS. 5A to 5C, as best shown in FIG. 5B, the transmission 538 in this example also includes two or more lower drawbar member connection points 588 for connecting the transmission 538 to the lower drawbar members of the drawbar assembly. Only one of the lower drawbar member connection points 588 is visible in FIG. 5B; the lower drawbar member connection point on the far-side of the transmission 538 in the figure is obscured by other parts of the transmission 538. In this example, the lower drawbar member connection points 588 are provided as threaded holes in a side surface of the housing of the transmission—with at least one lower drawbar member connection point 588 on each side of the transmission 538. Bolts can be inserted through a lower drawbar member to secure the transmission 538 to the lower drawbar member. As shown in FIG. 5C, at least a portion of the lower drawbar members 558 can abut a side wall of the transmission 538 such that they can be secured together using the lower drawbar member connection points 588 on the transmission 538. For example, the lower drawbar members 558 can have holes through which bolts can be passed as they are inserted into the housing of transmission housing 538. These connections can advantageously provide yet further stiffness in the structure without requiring additional material in the drawbar assembly or the frame.

In addition to the foregoing the invention is considered non-limitingly to reside in methods as described herein and also in a combination of a tractor 11 and baling machine 10 as described, and especially in such a combination in which the tractor 11 tows the baling machine 10 with a rotatable power take-off shaft 13 connected between the power take-off 12 of the tractor 11 and the rotary input shaft 27 of the baling machine 10.

Preferences and options for a given aspect, feature or parameter of the invention should, unless the context indicates otherwise, be regarded as having been disclosed in combination with any and all preferences and options for all other aspects, features and parameters of the invention.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural baling machine, comprising:
   a frame;
   a connection point configured for attaching to a towing vehicle and including a height relative to the frame;
   a plunger configured for being in a bale-forming chamber;
   a driveline configured for taking power from the towing vehicle and for causing reciprocal rectilinear motion of the plunger in the bale-forming chamber, wherein the driveline comprises a rotary input shaft; and
   a drawbar member that provides a mechanical link between the connection point and the frame, wherein the drawbar member is rotatably coupled to the frame such that the height of the connection point relative to the frame of the baling machine is adjustable,
   wherein a relative orientation and position of the drawbar member with respect to the rotary input shaft is adjustable such that (i) the drawbar member is located at an elevation below the rotary input shaft when the drawbar member is maintained in a lower hitch configuration and (ii) the drawbar member is located at an elevation above the rotary input shaft when the drawbar member is maintained in an upper hitch configuration.

2. The baling machine of claim 1, further comprising an adjustable support member that is:
   adjustable in a length; and
   connected, one of directly and indirectly, between the frame and the drawbar member.

3. The baling machine of claim 2, wherein said adjustable support member includes a spindle such that the length of the adjustable support member is manually adjustable.

4. The baling machine of claim 2, wherein the adjustable support member includes an actuator such that the length of the adjustable support member is configured for being one of automatically and remotely controlled.

5. The baling machine of claim 4, further comprising:
   at least one sensor configured to generate sensed-height-data that is representative of a height of a towing hitch at a rear of the towing vehicle; and
   a controller configured to process the sensed-height-data and to automatically control the actuator to set the length of the adjustable support member, and thereby to adjust the height of the connection point such that the connection point is suitable for attaching to the towing hitch of the towing vehicle.

6. The baling machine of claim 2, wherein the frame includes an upper drawbar support connection point, the drawbar member including a drawbar support connection point, a longitudinal dimension, and a central region in the longitudinal dimension, the adjustable support member being rotatably connected between: (i) the upper drawbar support connection point on the frame, and (ii) the drawbar support connection point that is associated with the central region, in the longitudinal dimension, of the drawbar member.

7. An agricultural baling machine, comprising:
   a frame;
   a connection point configured for attaching to a towing vehicle and including a height relative to the frame;
   a plunger configured for being in a bale-forming chamber;
   a driveline configured for taking power from the towing vehicle and for causing reciprocal rectilinear motion of the plunger in the bale-forming chamber;
   a drawbar member that provides a mechanical link between the connection point and the frame, wherein the drawbar member is rotatably coupled to the frame such that the height of the connection point relative to the frame of the baling machine is adjustable; and
   an adjustable support member that is:
      (i) adjustable in a length; and
      (ii) connected, one of directly and indirectly, between the frame and the drawbar member,
   wherein said adjustable support member includes a spindle such that the length of the adjustable support member is manually adjustable,
   wherein the drawbar member includes a lower drawbar member, the baling machine further comprising at least one side and a drawbar assembly, the drawbar assembly providing a mechanical link between the connection point and the frame, wherein the drawbar assembly includes, on the at least one side of the baling machine, the lower drawbar member and an upper drawbar member, wherein both the lower drawbar member and the upper drawbar member extend in a longitudinal direction of the baling machine from the frame towards the connection point.

8. The baling machine of claim 7, wherein the adjustable support member is connected between the upper drawbar member and the lower drawbar member.

9. The baling machine of claim 7, wherein the driveline includes at least one component, the lower drawbar member being spaced apart from the upper drawbar member in a vertical dimension such that the at least one component of the driveline is accessible from the side of the baling machine through the drawbar assembly.

10. The baling machine of claim 7, wherein the frame includes:
a lower drawbar connection point, to which the lower drawbar member is rotatably connected; and
an upper drawbar connection point, to which the upper drawbar member is connected, wherein the lower drawbar connection point is further forwards on the frame, in a longitudinal dimension of the baling machine, than the upper drawbar connection point.

11. The baling machine of claim 10, further comprising:
an upper drawbar support member, the upper drawbar member including a distal portion, the frame including a drawbar support connection point, the upper drawbar support member being connected between: (i) the distal portion of the upper drawbar member, and (ii) the drawbar support connection point on the frame, wherein the drawbar support connection point is vertically lower than the upper drawbar connection point.

12. The baling machine of claim 7, wherein the driveline comprises at least one of a rotary input shaft, a transmission, a rotatable flywheel, and a flywheel shaft.

13. The baling machine of claim 7, wherein the drawbar assembly includes a first lower drawbar member, a first upper drawbar member, a second lower drawbar member, and a second upper drawbar member, said first lower drawbar member being the lower drawbar member and the first upper drawbar member being the upper drawbar member, the side being a first side, the baling machine further comprising a plurality of sides including the first side and a second side,
the first lower drawbar member and the first upper drawbar member being on the first side of the baling machine, and
the second lower drawbar member and the second upper drawbar member being on the second side of the baling machine, wherein both the second lower drawbar member and the second upper drawbar member extend in the longitudinal direction of the baling machine from the frame towards the connection point,
wherein, the first lower drawbar member is rotatably coupled to the frame, and
the second lower drawbar member is rotatably coupled to the frame.

14. The baling machine of claim 13, wherein:
the driveline includes a plurality of components,
the first lower drawbar member is spaced apart from the first upper drawbar member in a vertical dimension such that at least one of the plurality of components of the driveline is accessible from at least one of the plurality of sides of the baling machine through the drawbar assembly, and
the second lower drawbar member is spaced apart from the second upper drawbar member in a vertical dimension such that at least one of the plurality of components of the driveline is accessible from at least one of the plurality of sides of the baling machine through the drawbar assembly.

15. The baling machine of claim 14, further comprising an upper lateral supporting member, the first upper drawbar member including a distal end and the second upper drawbar member including a distal end, the upper lateral supporting member being connected between the distal end of the first upper drawbar member and the distal end of said second upper drawbar member.

16. An agricultural baling machine, comprising:
a frame;
a connection point configured for attaching to a towing vehicle and including a height relative to the frame;
a plunger configured for being in a bale-forming chamber;
a driveline configured for taking power from the towing vehicle and for causing reciprocal rectilinear motion of the plunger in the bale-forming chamber;
a drawbar member that provides a mechanical link between the connection point and the frame, wherein the drawbar member is rotatably coupled to the frame such that the height of the connection point relative to the frame of the baling machine is adjustable; and
an adjustable support member that is:
(i) adjustable in a length; and
(ii) connected, one of directly and indirectly, between the frame and the drawbar member,
wherein said adjustable support member includes a spindle such that the length of the adjustable support member is manually adjustable.

* * * * *